Feb. 20, 1962  J. LOOMAN  3,021,829
APPARATUS FOR THE DRESSING OF PROFILED GRINDING DISKS
FOR THE GRINDING OF HELICAL INVOLUTE SPUR GEARS
Filed July 6, 1959
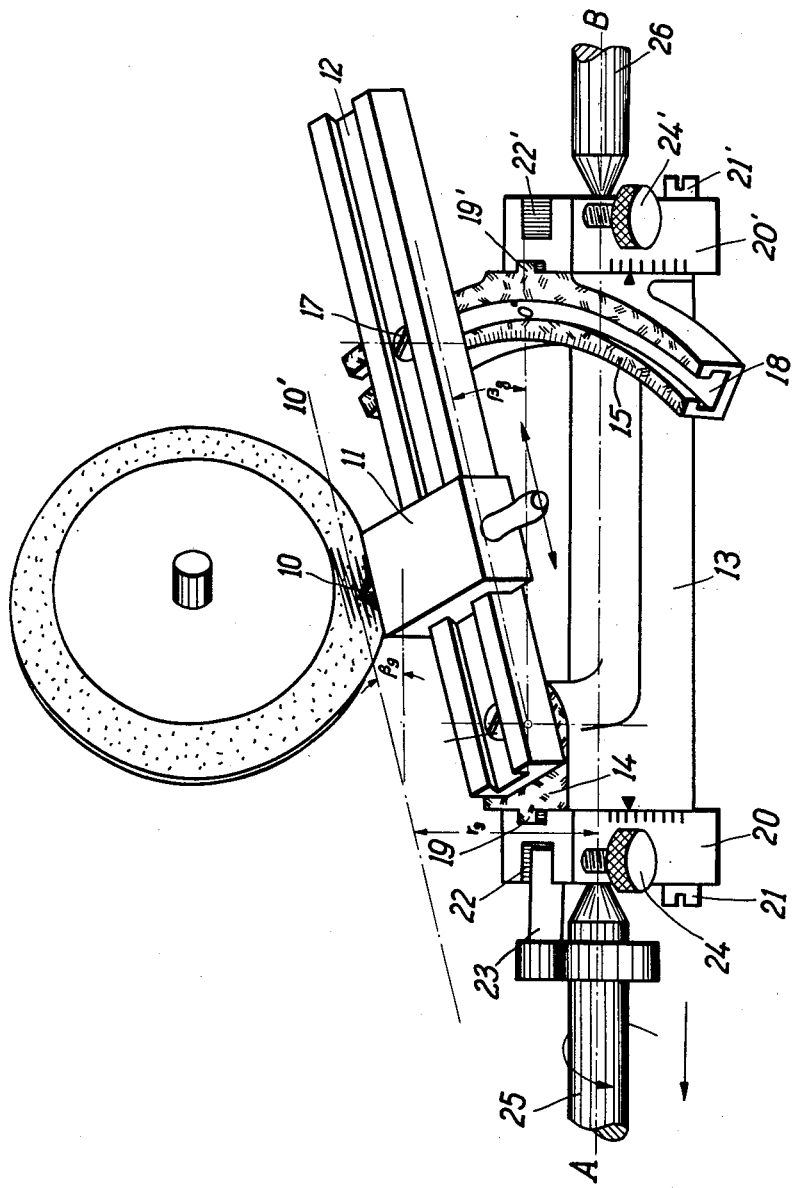
Inventor:
JOHANNES LOOMAN
BY
ATTORNEY 3,021,829
APPARATUS FOR THE DRESSING OF PROFILED GRINDING DISKS FOR THE GRINDING OF HELICAL INVOLUTE SPUR GEARS
Johannes Looman, Friedrichshafen am Bodensee, Germany, assignor to Zahnradfabrik Friedrichshafen, Aktiengesellschaft, Friedrichshafen am Bodensee, Germany
Filed July 6, 1959, Ser. No. 825,113
Claims priority, application Germany July 8, 1958
16 Claims. (Cl. 125—11)

The invention relates to grinding wheels for manufacturing helical involute spur gears and more particularly to machines for profiling such grinding wheels.

Prior devices for profiling gear grinding wheels have been known wherein a diamond is used for cutting the wheel and wherein the diamond is moved with a particular helical motion combined with movement on a straight generatrix line. Such an arrangement is shown, for example in U.S. Patent No. 2,148,955. In that patent the point of the diamond moves on the line of contact between the grinding disk and the helical tooth flank to be ground. The linear displacement of the diamond in performing its motion along this line is effected by means of sliding compound motion arrangement which guides the diamond in its movement in such a path that the axis of the diamond intersects the axis of the grinding wheel. Such an arrangement has a disadvantage in that the mechanism has a tendency to lock in its movement, this locking tendency being most pronounced when the diamond is cutting on a small angle of slope $\beta g$.

My present invention has for its primary object the overcoming of the above disadvantage by providing a diamond guiding mechanism having no tendency to lock, regardless of slope angle.

Another object of the invention is to provide a sturdy, compact, and economically manufacturable device which can be used in conjunction with a standard tool-grinding lathe for the purpose intended.

A still further object of the invention is to provide means whereby the diamond tool may be guided at a readily adjustable angle of slope for a particular helical curve.

A further object is to provide a device which may be adjusted for cutting teeth on varying gear diameters.

An additional object of the invention is to provide a device which may be reversibly connected to the power setup; that is, a gear-grinding lathe, in order to cut both faces of a grinding wheel.

A still further object and very important object is to provide a mechanism which can be quickly and precisely adjusted to effect variations in slope $\beta g$ of helical cutting, for changes in root circle diameter $r_g$ and for tooth thickness.

In addition, an object of the invention is to provide a combination which, once all adjustments have been made, forms a solid mass of components integrally secured to each other and one in which no part has motion relative to another part, except for the required reciprocal cutting motion of the diamond cutting point.

Briefly, my invention comprises the combination of a guide which holds the cutting diamond at a fixed angle with respect to the axis about which the diamond oscillates, and wherein the guide is supported on a carrier mounted between head stock and tail stock points in such a way as to provide for angular adjustability. As illustrated in the present embodiment of my invention, the guide is merely a straight bar or rail for slidably carrying a block on which the diamond cutting point is mounted. The carrier itself is carried between certain guide elements which engage the head stock and tail stock, the modes of attachment for these components being such that the carrier may be adjusted in the plane of the axis of the head stock and tail stock. Thus, the two degrees of adjustability hereinabove mentioned provide for changing the helical angle of cut and also provide for compensating for different thickness of grinding wheels.

A detailed description of the invention will now be given in conjunction with the appended drawing showing a perspective of the essential components of my novel combination.

Referring to the drawing, the invention comprises a head stock 25 and tail stock 26, respectively, of a gear-grinding lathe, as shown, in axial alignment between which is carried a cutting diamond 10 for profiling the face of a grinding wheel shown in conjunction therewith. The diamond point is carried on a cradle 11 which can reciprocate in a guide bar or rail 12. Such reciprocation would normally be effected by any conventional means, for example, a hydraulic motor or an electric motor, etc., suitably connected to the cradle in a manner known to persons skilled in the art, as by means of a flexible shaft.

The guide rail 12 is adjustably carried in a plane parallel to the axis A—B, which axis is the axis of the head stock and the tail stock, and will be understood to become the axis of the workpiece in grinding a gear. The guide rail is supported on a carrier 13 having surfaces 14 and 15 on which the guide rail rests. The guide rail is pivotally secured to carrier 13 as by a screw 16 and the hold-down screw 17. From the construction, it will be apparent that the guide rail can be swung about the axis of screw 16 in order to adjust its angularity with respect to the grinding wheel, and clamped in any desired position by tightening the screws 16 and 17. It will be understood that the screw 17 has a suitable nut element slidably within the arcuate, T-shaped slot 18 below the surface 15.

Carrier 13 is slidably keyed as by means of a pair of keys 19 and 19', as shown, and is carried in guide elements 20 and 20'. Thus, the keys are smoothly and slidably fitted within channels of the respective guide elements, as will be apparent from the drawing, as shown. Pressure of the head stock and tail stock points is relied on to maintain the elements 13, 20, and 20' in position relative to each other. A pair of respective screws 21 and 21' are utilized for the purpose of holding carrier 13 in relation to the guide pieces 20 and 20' so that the shortest distance of the point of the cutting diamond 10 from the axis of the work-piece, which is the axis A—B between points, is equal to the radius $r_g$ of the base circle of the gear tooth system.

Each guide piece 20 and 20' is provided with a respective slot 22 and 22' for accommodating a dog 23 at the head stock end of the lathe, which will be understood to connect the head stock for rotative motion with carrier 13. Carrier 13 can be angularly adjusted with respect to the dog 23 to provide for different thicknesses of teeth to be cut by means of screws 24 and 24' provided within the respective guide pieces 20 and 20'. Thus, the dog 23 is carried by head stock 25 of the grinding machine and it transfers helical motion (as indicated by the arrows) of the head stock to the dressing tool.

The carrier 13 can be reversed from the position shown so as to cut the reverse working face tooth of a two-face teeth grinding disk or to cut a new face on another grinding disk. In such case, dog 23 then would go into slot 22'.

In a device as described above, considerable precision can be achieved, because the carrier 13, together with the guide rail 12 and the adusting devices for adjusting for the helical angle $\beta g$ and the root circle $r_g$ and for tooth thickness, all form an integral combination; that is, one of solid mass having no relatively moving parts once adjustments have been made. Inasmuch as the tool, in substitution of the workpiece, is accommodated between the points of the head stock 25 and tail stock 26, no mistakes of alignment can arise. The tool can be set conveniently and with considerable precision inasmuch as the diamond cuts a geometrically correct envelope for an involute helicoidal surface. The variables $r_g$ and $\beta g$ can be adjusted for in this mechanism independently of each other with adjustment being made systemically until the desired dimensional grinding has been precisely achieved.

Having thus described my invention, I am aware that various changes may be made without departing from the spirit of the invention and, accordingly, I do not seek to be limited to the precise illustration herein given except as set forth in the appended claims.

I claim:

1. In a mechanism for profiling grinding disks for grinding helical involute spur gears from blanks, a carrier means and means for supporting said carrier means between the head stock and tail stock of a gear blank grinding lathe, a guide rail carried by said carrier means at a predetermined angle with respect to the axis of said head stock and tail stock, said angle being the helix angle of the gear to be ground by a grinding disk profiled by said mechanism, a cutting tool holder mounted on said guide rail and being reciprocally movable thereon during operation of the mechanism, whereby said device may be removed from said grinding machine and a gear blank substituted therefor to be ground by said grinding wheel.

2. In a device as set forth in claim 1, said guide rail being pivotally carried on said carrier means for effecting a predetermined line of motion of said cutting tool holder at said predetermined angle and means for securely and integrally fastening said guide rail to said carrer means at said predetermined angle.

3. In a device as set forth in claim 2, said carrier means being supported at opposed ends thereof, said means for supporting said carrier means comprising a guide element at each end of said carrier means and means for effecting translational adustability at each end guide element relative to the axis of said head stock and tail stock, said guide elements being engageable with the head stock and tail stock.

4. In a mechanism for profiling grinding disks for grinding helical involute spur gears from blanks, a carrier means and means for supporting said carrier means between the head stock and tail stock of a gear blank grinding lathe, a guide rail carried by said carrier means at a predetermined angle with respect to the axis of a gear blank when mounted for grinding, a cutting tool holder mounted on said guide rail and being reciprocally movable thereon during operation of the mechanism, whereby said device may be removed from said grinding machine, and a gear blank substituted therefor to be ground by said grinding wheel, wherein said support means is reversible with said guide rail fastened thereto for profiling homologous grinding surfaces of two disks, said means for supporting said carrier means being selectively engageable with either the head stock or the tail stock and means for driving either of said support means by said head stock.

5. In a mechanism for profiling grinding disks for grinding helical involute spur gears from blanks, a carrier means and means for supporting said carrier means between the head stock and tail stock of a gear blank grinding lathe, a guide rail carried by said carrier means at a predetermined angle with respect to the axis of a gear blank when mounted for grinding, a cutting tool holder mounted on said guide rail and being reciprocally movable thereon during operation of the mechanism, whereby said device may be removed from said grinding machine, and a gear blank substituted therefor to be ground by said grinding wheel, said carrier means being supported at opposed ends thereof, said means for supporting said carrier means comprising a guide element at each end of said carrier means and means for effecting adjustability at each end of said carrier means with the respective guide element, said guide elements being engageable with the head stock and tail stock, wherein said support means is reversible with said guide rail fastened thereto for profiling homologous grinding surfaces of two disks, said means for supporting said carrier means being selectively engageable with either the head stock or the tail stock and means for driving either of said support means by said head stock.

6. In a mechanism for profiling grinding disks for grinding helical involute spur gears from blanks, a carrier means and means for supporting said carrier means between the head stock and tail stock of a gear blank grinding lathe, a support rail carried by said carrier means at a predetermined angle with respect to the axis of a gear blank when mounted for grinding, a cutting tool holder mounted on said support rail and being reciprocally moving thereon during operation of the mechanism, whereby said device may be removed from said grinding machine and a gear blank substituted therefor to be ground by said grinding wheel, said guide rail being pivotally carried on said carrier means for effecting a predetermined line of motion of said cutting tool holder at said predetermined angle and means for securely and integrally fastening said guide rail to said carrier means at said predetermined angle, said latter means comprising a protractor scale member integral with said carrier means and adjacent an end of said guide rail for setting said guide rail to said predetermined angle and means for securing said end of said guide rail to said protractor scale member.

7. In a mechanism for profiling grinding disks for grinding helical involute spur gears, a carrier means and means for supporting said carrier means between the head stock and tail stock of a grinding lathe, a guide rail carried by said carrier means at a preedtermined angle with respect to the common axis of the head stock and the tail stock, said angle being equal to the helix angle ($\beta g$) of the gear blank to be ground, a cutting tool mounted for reciprocal motion on said guide rail, the shortest distance between the common axis of said head stock and tail stock and the path of said cutting tool being equal to the radius ($r_g$) of the base circle of the gear tooth system, a helical motion corresponding to the helix of said gear blank being imparted to said carrier means, whereby said mechanism may be removed from said lathe, and a gear blank substituted therefor to be ground by said grinding disk.

8. In a device as set forth in claim 7, said guide rail being pivotally carried on said carrier means for varying the angle of cutting of said cutting tool and means for securely and integrally fastening said guide rail to said carrier means.

9. In a device as set forth in claim 8, said carrier means being supported at opposed ends thereof, said means for supporting said carrier means comprising a guide element at each end of said carrier means and means for effecting adjustability at each end of said carrier means with the respective guide element to adjust said shortest distance to the radius ($r_g$) of the base circle of the gear tooth system, said guide elements being engageable with the head stock and tail stock to impart a helical motion equal to the helix of said gear blank to said carrier means.

10. In a device as set forth in claim 8, wherein said support means is reversible with said guide rail fastened thereto for profiling homologous grinding surfaces of two disks, said means for supporting said carrier means being selectively engageable with either the head stock or the tail stock, and means for driving either of said support means by said head stock to impart a helical motion to said carrier means.

11. A method for profiling grinding disks for grinding helical involute spur gears which comprises rotating a grinding disk blank in contiguity with a cutting point while moving said cutting point in a direction at an angle to a fixed axis such that said angle is equal to the helix angle of a gear blank to be ground by said disk, and simultaneously rotating said cutting point around said fixed axis on a radius which is equal to the radius of the base circle of a gear tooth to be ground on said gear blank, whereby said cutting point describes a helical path during a profiling operation.

12. In a mechanism for profiling grinding disks for grinding helical involute spur gears, a carrier means and means for supporting said carrier means between the head stock and tail stock of a grinding lathe, a guide rail carried by said carrier means at a predetermined angle with respect to the common axis of the head stock and the tail stock, said angle being equal to the helix angle of the gear blank to be ground, a cutting tool mounted for reciprocal motion on said guide rail, wherein the shortest distance between the axis of said head stock and tail stock and the reciprocal path of said cutting tool is equal to the radius of the base circle of teeth to be ground from a blank by said grinding disk, and means for effecting a helical motion of said carrier means during cutting of said grinding disk, whereby said mechanism may be removed from said lathe, and a gear blank substituted therefor to be ground by said grinding disk.

13. In a device as set forth in claim 12, said guide rail being pivotally carried on said carrier means for varying the angle of cutting of said cutting tool and means for securely and integrally fastening said guide rail to said carrier means.

14. In a device as set forth in claim 13, said carrier means being supported at opposed ends thereof, said means for supporting said carrier means comprising a guide element at each end of said carrier means and means for effecting adjustability at each end of said carrier means with the respective guide element to adjust said shortest distance to the radius ($r_g$) of the base circle of the gear tooth system, said guide elements being engageable with the head stock and tail stock to impart a helical motion equal to the helix of said gear blank to said carrier means.

15. In a device as set forth in claim 13, wherein said support means is reversible with said guide rail fastened thereto for profiling homologous grinding surfaces of two disks, said means for supporting said carrier means being selectively engageable with either the head stock or the tail stock, and means for driving either of said support means by said head stock to impart a helical motion to said carrier means.

16. A method for profiling grinding disks for grinding helical involute spur gears which comprises rotating a grinding disk blank in contiguity with a cutting point while moving said cutting point in a directon at an angle to a fixed axis such that said angle is equal to the helix angle of a gear blank to be ground by said disk, and simultaneously rotating said cutting point around said fixed axis on a radius which is equal to the radius of the base circle of a gear tooth to be ground on said gear blank, whereby said cutting point describes a helical path during a profiling operation, and maintaining said cutting point in to-and-fro oscillation while describing said helical path.

References Cited in the file of this patent
UNITED STATES PATENTS

| | | |
|---|---|---|
| 1,721,103 | Candee | July 16, 1929 |
| 2,154,938 | Hofer | Apr. 18, 1939 |
| 2,448,551 | Schroeder | Sept. 7, 1948 |